June 28, 1927.
R. GREINER
1,633,986
ARTIFICIAL EYE
Filed July 24, 1926
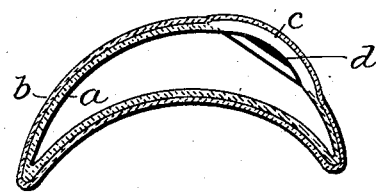
INVENTOR.
Richard Greiner
BY
ATTORNEY.

Patented June 28, 1927.

1,633,986

UNITED STATES PATENT OFFICE.

RICHARD GREINER, OF BERLIN, GERMANY.

ARTIFICIAL EYE.

Application filed July 24, 1926, Serial No. 124,780, and in Germany November 17, 1925.

This invention relates to improvements in artificial eyes.

In the construction of artificial eyes, the white cornea or sclerotic has hitherto been made from cryolith (opalescent glass) on which the coloured iris is fused, burned or painted.

This opalescent glass is in use continually subjected to the action of tears, which, in conjunction with the air, so affect the glass that it soon becomes changed in colour and darkened, so that the artificial eye becomes useless.

This disadvantage is avoided according to the invention, wherein the opalescent glass, representing the white sclerotic, is covered with a thin colourless layer of crystal glass, which is not affected by tears. Consequently, a change of colour of the eye during use is avoided.

The production of such an artificial eye can be effected, for example, as follows, that is to say, the raw material of the white sclerotic is covered with crystal glass before the iris is made; or the covering layer of crystal glass can be applied to the artificial eye when the latter is completely fashioned.

Referring to the drawing, which shows an artificial eye in cross section,

Figure 1 shows the iris and pupil uncoated;

Fig. 2 shows the entire eye coated.

The body of the eye $a$ of opalescent glass has a covering $b$ of clear glass, preferably crystal glass, covering the body of the eye except as to the portion $c\ d$ comprising the iris and pupil, and in case it is desired to cover the entire assembled eye with a clear glass, this can readily be done.

The crystal glass is not affected by the fluids of the eye and the air.

I claim:

1. An artificial eye, wherein the white cornea or sclerotic of opalescent glass, is covered with a thin layer of colourless crystal glass.

2. An artificial eye comprising a body portion of opalescent glass coated with a thin layer of clear crystal glass.

3. An artificial eye having a colored fused body portion coated with crystal glass.

In testimony whereof I have signed my name to this specification.

RICHARD GREINER.